United States Patent [19]

Long

[11] 4,400,728
[45] Aug. 23, 1983

[54] VIDEO PROCESS CONTROL APPARATUS

[75] Inventor: David J. Long, Wrightwood, Calif.

[73] Assignee: Everett/Charles, Inc., Fontana, Calif.

[21] Appl. No.: 237,689

[22] Filed: Feb. 24, 1981

[51] Int. Cl.³ .............................................. H04N 7/18
[52] U.S. Cl. .................................... 358/107; 358/903; 382/53
[58] Field of Search ......................... 358/93, 107, 903; 364/515, 516, 517; 340/146.3 H, 146.3 Q

[56] References Cited

U.S. PATENT DOCUMENTS 4,189,744 2/1980 Stern ...................................... 358/93

OTHER PUBLICATIONS

"Optomation Instrument System", General Electric Company, Jul., 1980.

Primary Examiner—Marc E. Bookbinder
Assistant Examiner—Edward L. Coles
Attorney, Agent, or Firm—Christie, Parker & Hale

[57] ABSTRACT

A video process control system for identifying, inspecting, or measuring machined parts or the like in which each part is placed in the viewing field of a video camera. A pixel scan of the camera image is converted to a set of binary bits, one bit for pixel, and the bits corresponding to one complete frame are stored in a frame memory. A plurality of digital control words stored in a memory each define a selected area or "window" in the field of view a predetermined number of bits of one value. Each word in memory is used to select a group of the stored pixel bits corresponding to the defined window. A counter counts the number of bits of one value in the select group, and their count is compared with desired number of bits defined by the same control word. The analysis is repeated for a plurality of the control words to get a complete measurement of a part.

12 Claims, 17 Drawing Figures

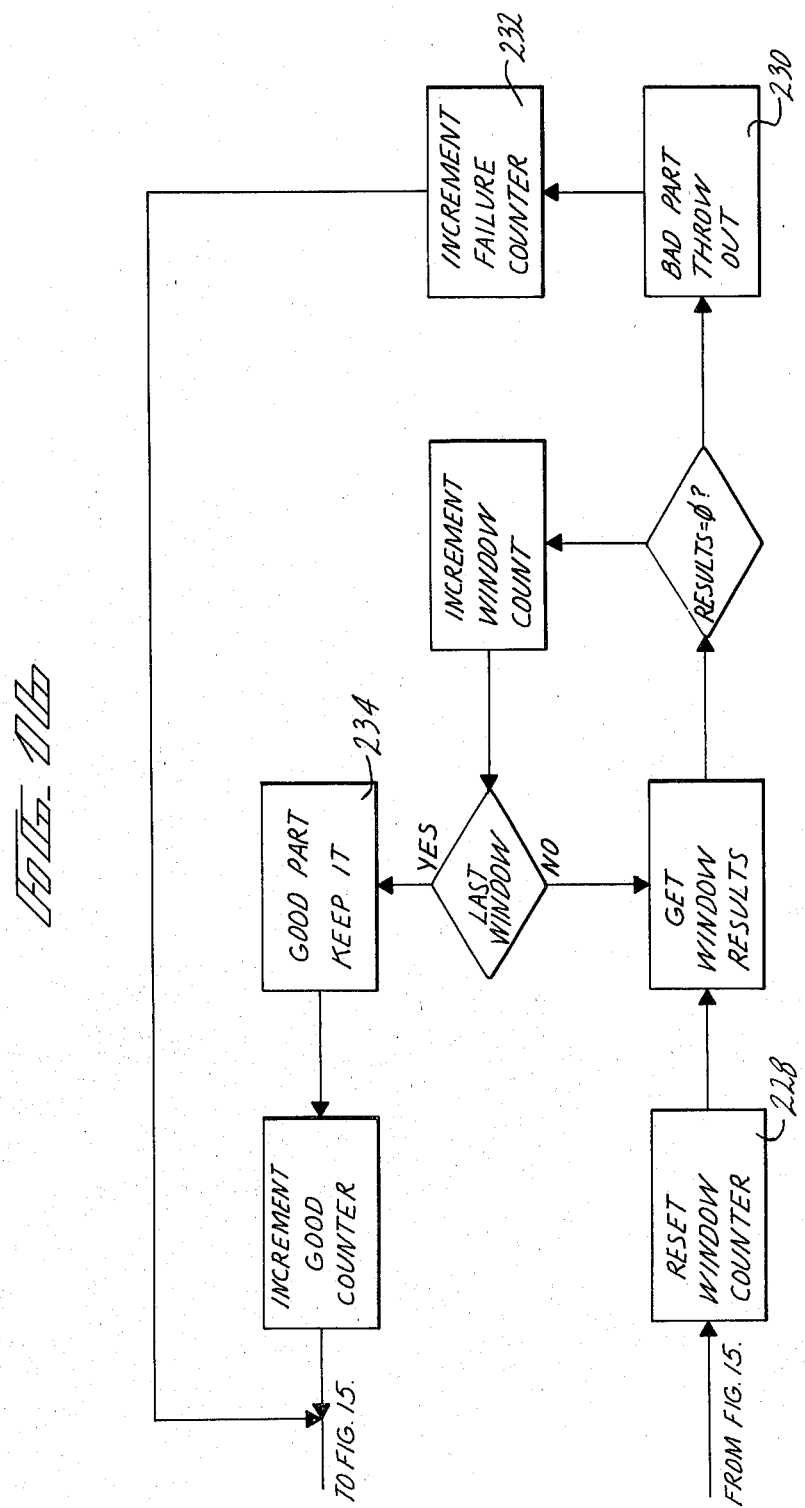

VIDEO PROCESS CONTROL APPARATUS

FIELD OF THE INVENTION

This invention relates to a video process control system, and more particularly, to a digital system for analyzing a video camera pixel scan.

BACKGROUND OF THE INVENTION

Automated production of assembly parts, for example, requires some means for identifying, inspecting, and measuring the parts at high speed. The use of a video camera to scan each part visually together with a digital system to analyze the video signal generated by the camera is well-known. One known prior art system converts each image pixel to a "black" or "white" binary coded bit. During a frame scan, this stream of bits is gated by a window generator to an accumulator. The window generator gates only the bits corresponding to pixels within a preselected window area within the camera field. The size of the window can also be preselected. The accumulator counts all the bits within the window that are of one value (either black or white). By providing multiple windows generators and at least as many accumulators, the black or white pixel count from more than one window can be counted during one frame scan. However, the number of windows is limited by the number of accumulators, and an accumulator cannot be assigned to more than one window at a time. Such a system is severely limited in the number and size of windows that can be used in the system by the number and capacity of the accumulators.

SUMMARY OF THE INVENTION

The present invention provides an improved video process control system in which as many as two thousand separate windows can be processed sequentially within one frame time. Each window may have its own associated tolerance factor. Only a single accumulator is required that is time shared by all of the available windows. Each window is processed separately in sequence. Window size, position and tolerance information can be changed dynamically in response, for example, to data accumulated on a preceding window in the sequence. This allows window positions to be reassigned after the position and orientation of a part within the camera field of view is determined by processing initial windows in the sequence. The system is controlled by a microprocessor and the software available to the microprocessor, giving the system user great flexibility in the operation and use of the system.

These and other advantages of the present invention are provided by storing one frame of the video output of a video camera in the form of one binary bit per pixel. Each bit is coded to indicate a black or white pixel. A parameter memory stores a plurality of separately addressable words, each word defining a window area within the camera image field and upper and lower limits of the number of black or white pixels within the defined window. The stored frame bits within a defined window area are counted and compared with the defined black or white pixel limits. This is repeated for any selected number of parameter words from the parameter memory to generate data on which a complete analysis of the image content can be carried out. The parameter memory allows a large number of windows of any selected size and position to be processed within one half frame time of the video camera.

BRIEF DESCRIPTION OF THE DRAWINGS

For a better understanding of the invention reference should be made to the accompanying drawings, wherein:

FIGS. 3-16 are schematic flow diagrams of the software used in controlling the system.

DETAILED DESCRIPTION

Figure 1:
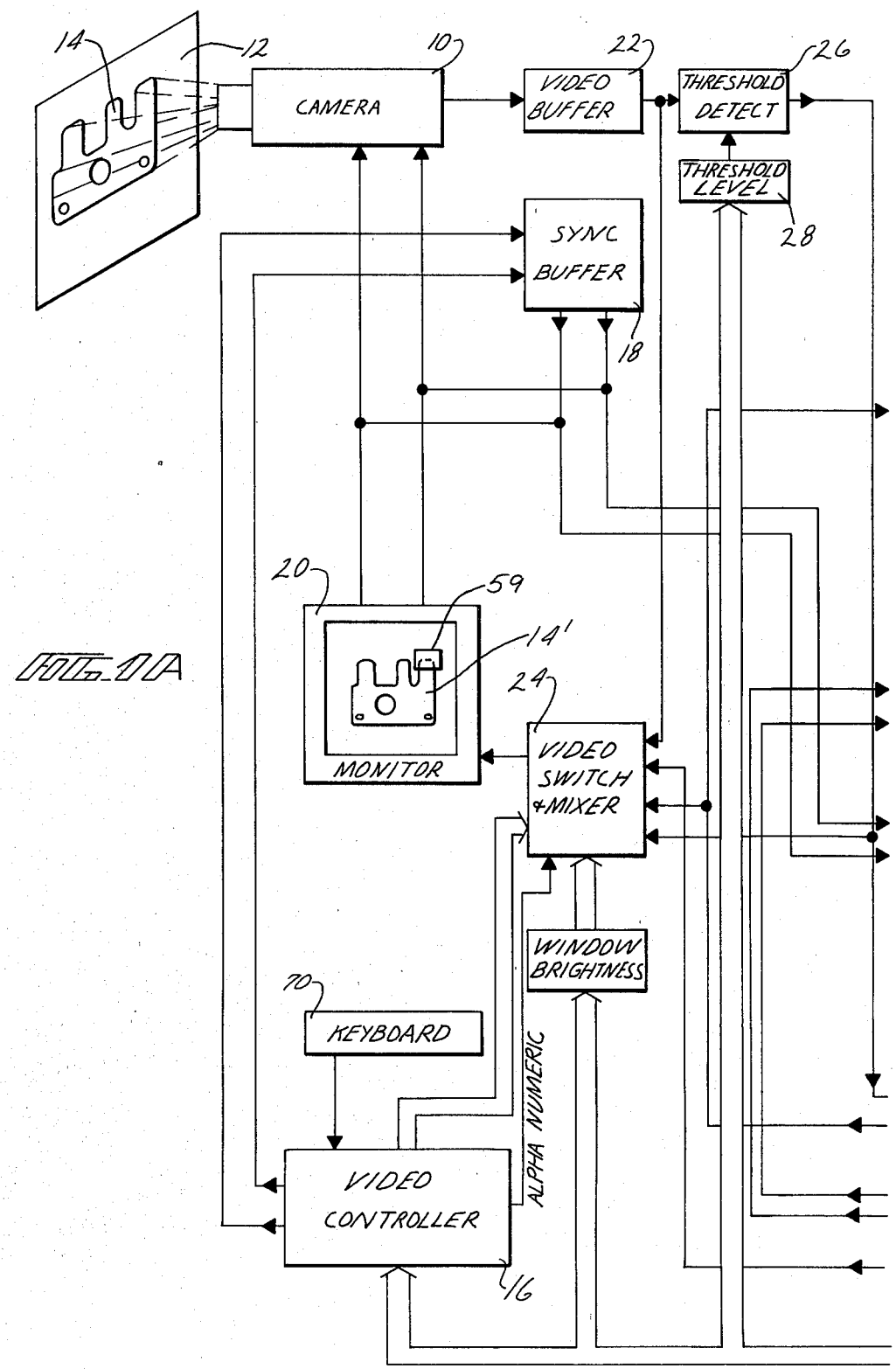
FIGS. 1A and 1B are a schematic block diagram of the video process control system.

Referring to FIG. 1 in detail, the numeral 10 indicates a video camera directed at a staging area 12 in which an element, such as an assembly part 14, is positioned within the field of view of the camera. The camera employs a raster scan which is synchronized with horizontal and vertical sync pulses derived from a standard video monitor controller circuit 16 through sync buffers 18. The same sync pulses control the raster scan of a cathode ray tube monitor 20. The sync pulses provide the standard thirty interlaced frames per second with 256 lines for each interlaced half frame. The output video signal from the camera 10 can be directly applied to the video input of the monitor 20 through a video buffer amplifier 22 and a video switch and mixer circuit 24. As described later in more detail, the video switch and mixer circuit 24 receives video input signals from a number of sources and may be controlled to select one or more of the inputs, mix the inputs, and couple them to the monitor 20.

The image represented by the video signal from the camera 10 is processed by applying the signal to the input of a threshold detect circuit 26 which compares the instantaneous amplitude of the video signal with a threshold level to determine whether the instantaneous amplitude is above or below the threshold level. The threshold detect circuit 26 produces an output that is at one of two levels, depending on whether the instantaneous amplitude of the input is above or below the threshold level. The threshold level can be adjusted by a threshold level control circuit 28 from a binary coded input signal in a manner hereinafter more fully described. Thus the threshold detect circuit converts the video signal to a corresponding black and white signal, which when applied to the monitor through the video switch and mix circuit 24, produces a silhouette image 14' on the monitor screen.

The video information from the output of the threshold detect circuit 26 is stored in digital form in a frame store memory 30. A half interlace frame of pixels is stored in digital form as 64K binary bits, corresponding to 256 lines of 256 pixels per line. The frame store memory is addressable by bit in response to address information from a window generator line counter/latch circuit 32 and a window generator bit counter/latch circuit 34. The bit counter is counted in response to clock pulses from a system clock at the rate corresponding to 256 pixels per line at the standard line rate. The line counter and bit counter are rest in synchronism with the vertical and horizontal sync pulses from the sync buffers 18. In a half frame time, all pixels representing a half interlace frame of 256 lines and 256 pixels per line are stored in binary form as a corresponding number of bits in the frame store memory 30. Thus the system "freezes" the black and white image of a half frame in the frame memory 30.

With the image information stored in digital form in the frame store memory 30 during a half frame interval of 1/60 second, the information is then analyzed and processed by the system during the remaining half frame interval. This alternate storing mode and process mode of operation is under the control of a central processing unit 38, which may, for example, be a unit including a standard 8080 processor chip. The central processor or CPU communicates with the system through an 8-bit data bus 40 and a 16-bit address bus (not shown). The software of the system is stored in a ROM memory and a RAM memory within the CPU 38 and controls the system in a manner described below in more detail in connection with the flow diagrams of FIGS. 3–16.

During the processing mode following the frame storing mode, the processor causes selected groups of black or white pixel bits corresponding to predetermined rectangular areas or "windows" in the video image field to be read out of the frame store memory, the number of black or white pixel bits within each selected window to be counted, and the number of bits compared with two predetermined black or white pixel numbers to determine whether the black or white image within the defined window is within predefined upper and lower limits.

Figure 2:
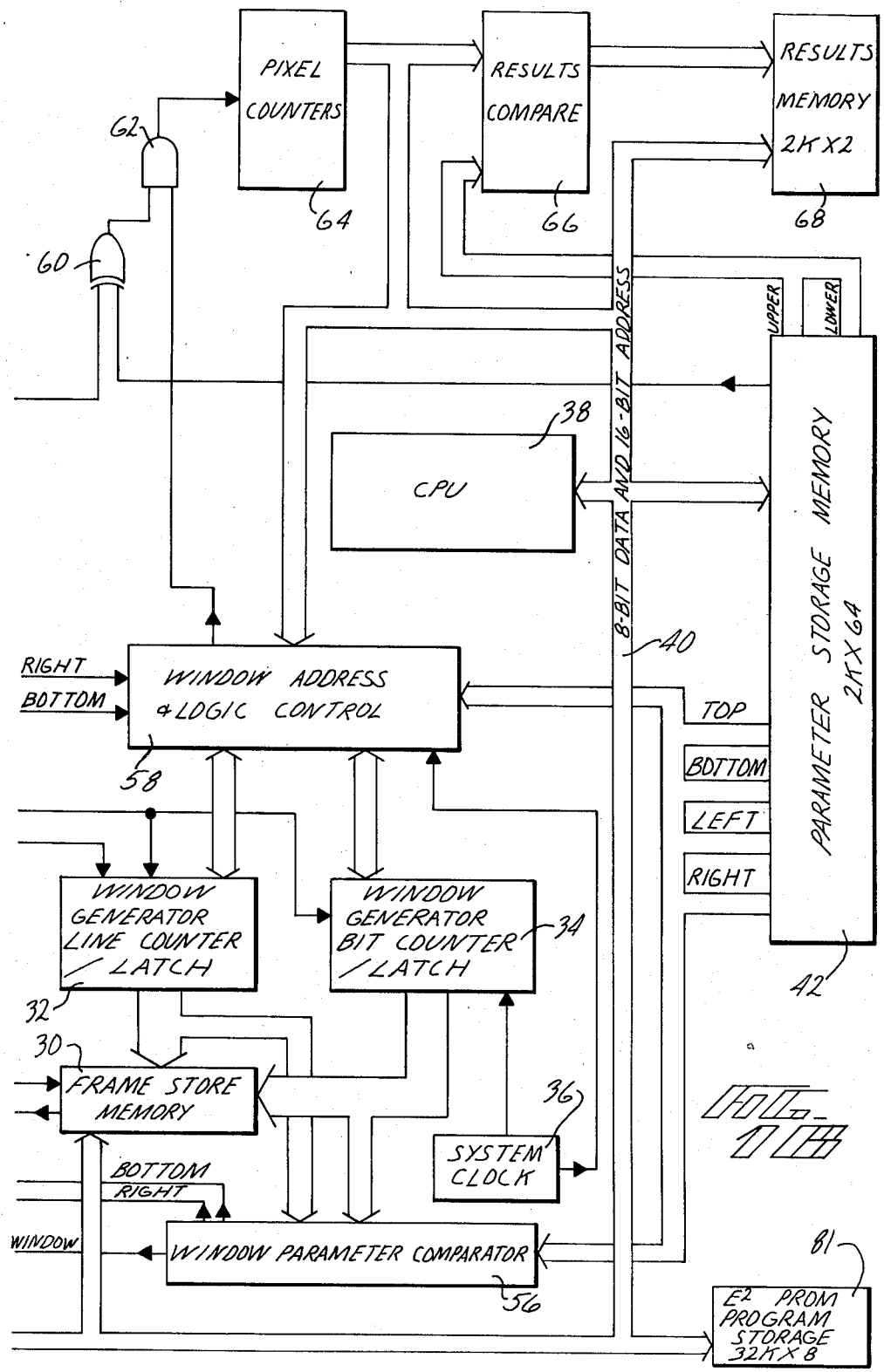
FIG. 2 is a schematic block diagram of the window parameter storage memory.

The information defining the borders of a window and the upper and lower limits of the number of black or white pixels within the window is stored as a single addressable 64-bit word in a parameter storage memory 42. The parameter storage memory 42 is shown in more detail in FIG. 2. The memory is arranged in 8 addressable memory groups, each group including two 4×2048 memory chips. Thus each group can store $2^{11}$ 8-bit bytes. The bytes are addressable by an eleven bit address generator 48, with one of the eight groups being selected by a group select generator 50. Eight bit bytes can be received or transmitted over the CPU data bus between each of the memory groups in the parameter storage memory 42 and the CPU 38. To this end, the data bus is connected to a bit-directional bus transceiver 52 in each of the memory groups. After any memory access, the bus transceiver automatically decouples that group from the processor data bus by assuming a high impedance state. The CPU data bus communicates with only one memory group at a time in response to the group select generator 50. The address generator 48 and group select generator 50 are controlled by the address bus from the CPU.

Since the memory chips are normally sitting in a read mode, the data present for any given address from the address generator 48 is output from the memory chips over an output bus driver 54. All eight groups can be addressed simultaneously so that 64 bits can be read out in parallel as a single window defining word from the eight memory groups. Thus the parameter storage memory 42 is used as a source of 2,048 addressable window words, each word being comprised of 64 bits. Thirty-two of these bits are used to define the left, right, top, and bottom margins of a window area. The eight bits defining the top correspond to the number of the line in the raster scan which is positioned at the top of the window. The eight bits defining the bottom of the window correspond to the number of the raster line at the bottom of the window. The two groups of eight bits defining respectively the left and right margins correspond to the number of the pixels in a line of the raster scan which are positioned respectively at the left and right margins of the window. The remaining 32 bits of each word in the parameter storage memory 42 define respectively the upper and lower limit of the number of black or white pixels of the image falling within the defined window and whether black or white pixels are to be selected.

The 32 bits defining the four margins of the window are applied in parallel to a window parameter comparator circuit 56. The window comparator 56 compares the eight bits of the window generator bit counter 34 with the eight bits corresponding to the left margin and the eight bits corresponding to the right margin in the word read out of the parameter storage memory 42. It also compares the eight bits of the window generator line counter 32 with the upper and lower margin defining bits of the same word from the parameter memory 42. The comparator circuit provides two output signals which indicate respectively when the window generator counters are addressing a line between the top and bottom margins of the window and a pixel between the right and left margins of the window defined by the word read out of the parameter storage memory 42. These two output signals are applied to a window address and logic control circuit 58. The window address and logic control circuit also receives the upper margin and the left margin parameters from the addressed word in the parameter memory and sets the window generators to the corresponding top line and left bit of the defined window. The window address and logic control circuit responds to words received over the data but from the CPU to control the counters 32 and 34 as required during the frame storing mode, when the counters are advanced in synchronism with the raster scan of the camera and monitor, and as required during the processing mode, when the counters are initially set to the top and left margin addresses of the window being processed. When the comparator 56 indicates the bit counter 34 corresponds to the right margin, the window address and logical control resets the bit counter to the left margin address and advances the line counter by one.

The window generator line and bit counters address and read out in sequence the black and white pixel defining bits stored in the frame store memory 30 that are within the right and bottom margins as determined by the compare circuit 56. The pixel bits within the window are thus read out in sequence from the frame store memory in response to the sequential counting of the window generator counters. These pixel bits are applied to the video switch and mixer 24 for display on the monitor, as indicated at 59, and also to one input of an Exclusive OR circuit 60 which also receives a pixel select bit from the word read out of the parameter storage memory 42. The Exclusive OR circuit 60, in effect, passes only all zero bits (black) or all one bits (white) from the frame store memory to an AND gate 62, depending upon whether the pixel select bit is a zero or a one. The gate 62 passes data accumulation clock pulses generated in the window address and logic control circuit to a pixel counter 64. It will be seen that the output of the gate 62 provides a clock pulse for each bit within the window area of the half frame stored in the frame store memory 30 which corresponds to either a black pixel or a white pixel of the video image. At the completion of the window count cycle, the pixel counter 64 indicates the number of white pixels or the number of black pixels within the selected window area.

The count condition of the pixel counter at the completion of the counting cycle is compared with the upper and lower limits as defined by the selected word read out of the parameter storage memory 42. A comparison circuit 66 provides a two bit output which is coded to indicate that the number of pixel bits counted is between the upper and lower limits, greater than the upper limit, or lower than the lower limit. These two bits are stored as one word in a results memory 68. The results memory 68 stores up to 2,048 words, one for each of the windows defined by the corresponding number of 64 bit words stored in the parameter storage memory 42.

It will be noted that the CPU has a 16-bit external address bus for selectively addressing the results memory 68, the parameter storage memory 42, the frame store memory 30, logic control circuit 58, the video controller 16, and the threshold level control circuit 28. Thus each of these elements of the system is under the control of the software stored in the program memory associated with the CPU 38. The video controller, which is a standard commercially available circuit normally used for controlling the display of alphanumeric information on a TV monitor, has a keyboard input 70. This same keyboard can be used as an input device to the CPU 38 through the processor data bus. The CPU 38 can also display alphanumeric messages on the monitor by using the video controller as an output device on the processor data bus. The alphanumeric information is directed to the video input of the monitor through the video switch and mixer 24. This allows the software to point out messages or data on the monitor screen. The processor data bus is also connected to the video switch and mixer so that the CPU controls which of the various input signals to the video switch are mixed and coupled to the monitor for display. It should be noted that one of the inputs to the video switch and mixer is the output of the window parameter comparator. The video switch and mixer includes a window brightness control which, in response to the window identifying signal from the window parameter comparator 56, modifies the brightness level of the video signal within the defined window area so that the window area can be observed on the monitor display superimposed on the image being analyzed but at a different brightness level.

Figure 3:
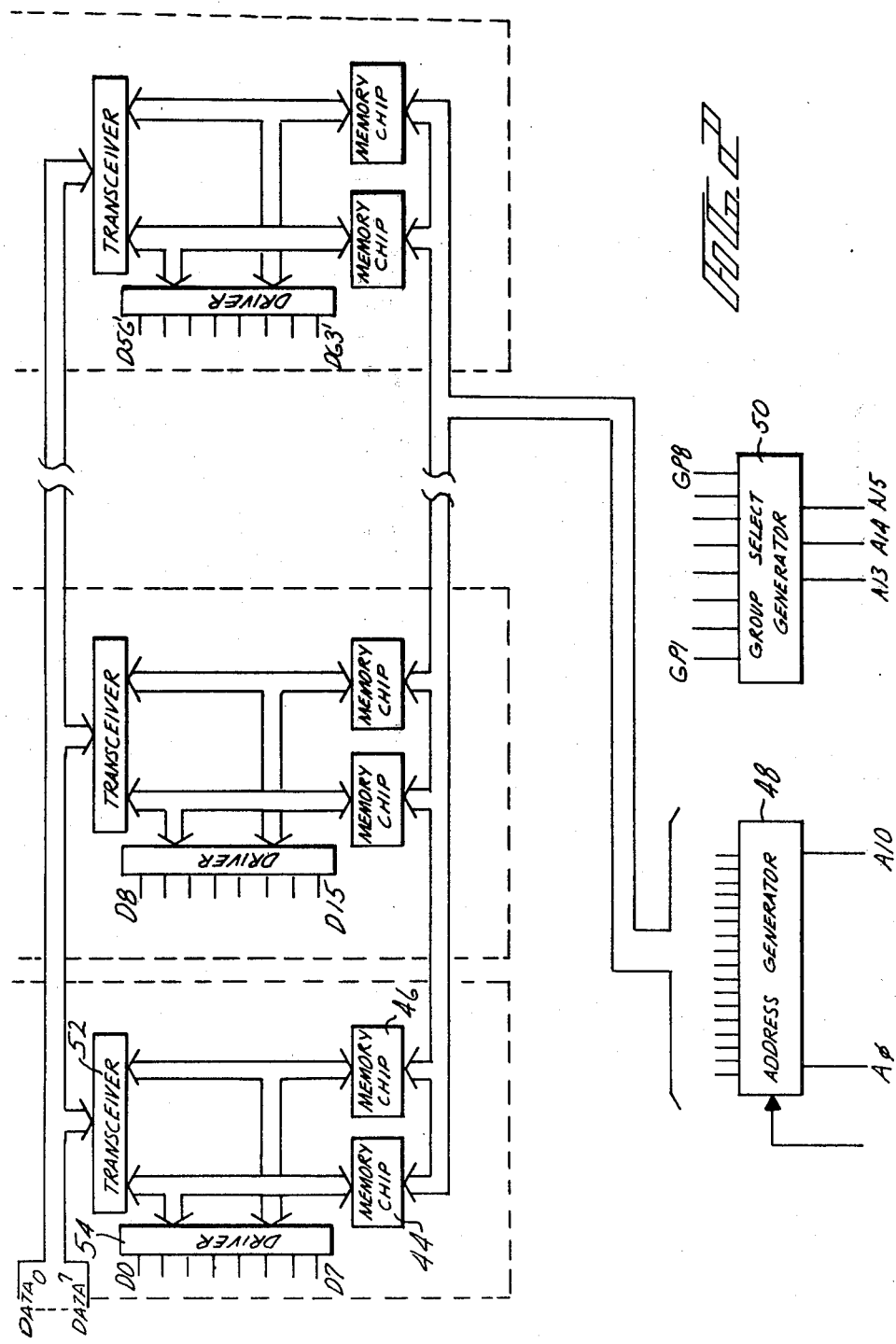

Referring to the flow diagram of FIG. 3, it will be seen that operation of the system begins by first initializing the system, indicated at 82, and causing output operator prompts to be displayed on the monitor. The operator responds to these prompts by imputting the the appropriate information through the keyboard 70. A determination is then made whether the operator has inputed a request to generate a new program or load a new program, as indicated at 84 and 85. Assuming the operator desires to load a new program, a new set of output operator prompts are displayed on the monitor, as indicated at block 86. The operator response is then inputed from the keyboard. The operator may request that the present program be run or that a new program be loaded from a separate memory, such as a PROM 81. (See FIG. 1B). If the present program is to be run, the program branches directly into the run mode as indicated at 87. If a new program is to be loaded from memory, the program branches to the PROM Load routine for loading a program into the CPU before branching to the run mode. During the run mode, a user program is run which performs the desired analysis. This program must first be generated by the operator to tailor the analysis to the particular requirements of the user.

To generate a new program, the operator keys in a request to enter a routine for generating a new program. In response to this request, the processor branches, as indicated at 84, to a Generate New Program routine (See FIG. 4) after displaying output operator prompts on the monitor, as indicated at 88. In response to these prompts, the operator may input that he wants to set up a window of a particular size, as indicated at 90, in which case the program branches to a Size routine. Alternately, the operator may select anyone of a number of other routines, such as a Window Position routine 107, Video Input Select routine 109, Window Brightness routine 111, or Threshold Adjust routine 113.

Figure 4:
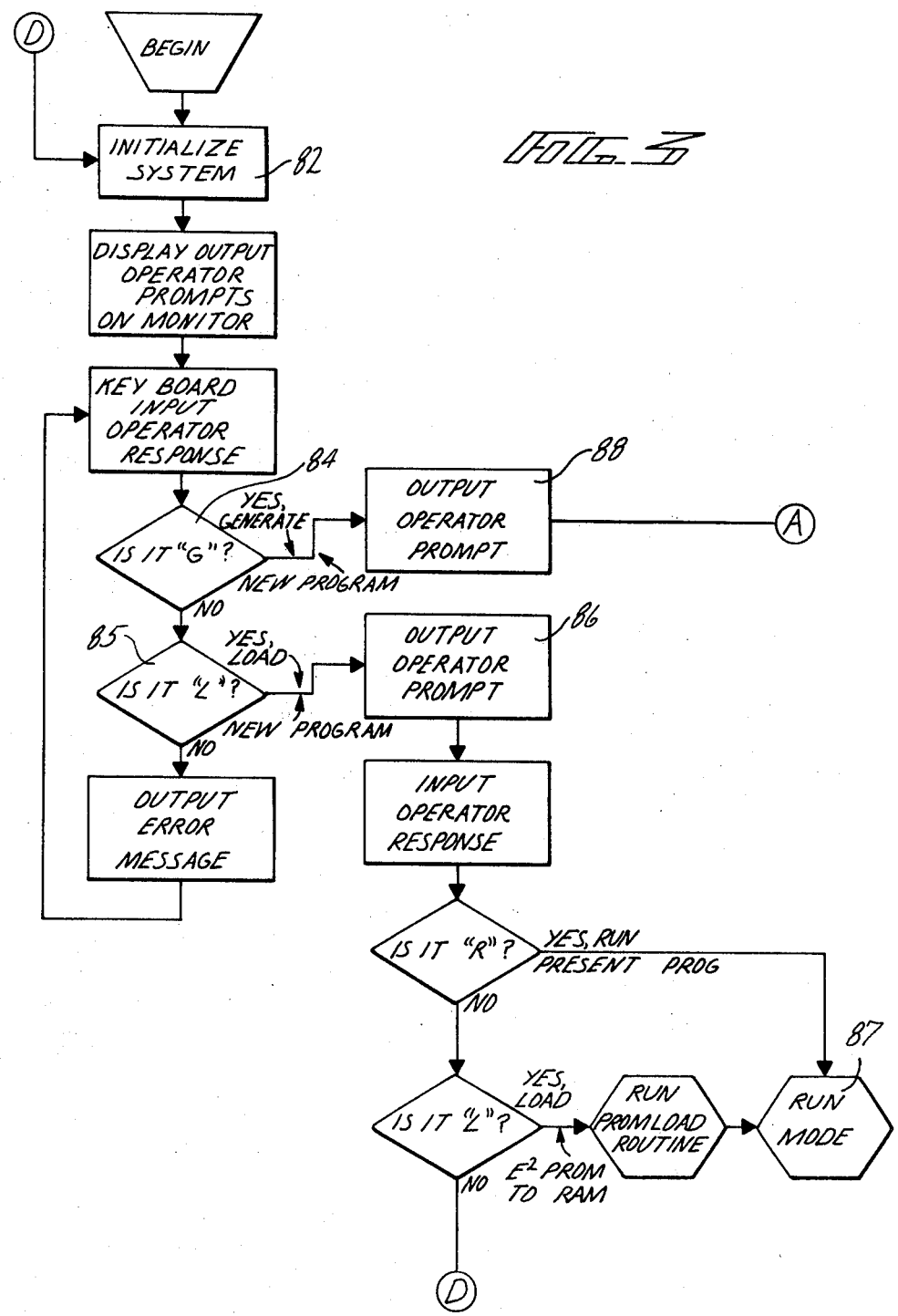
Figure 5:
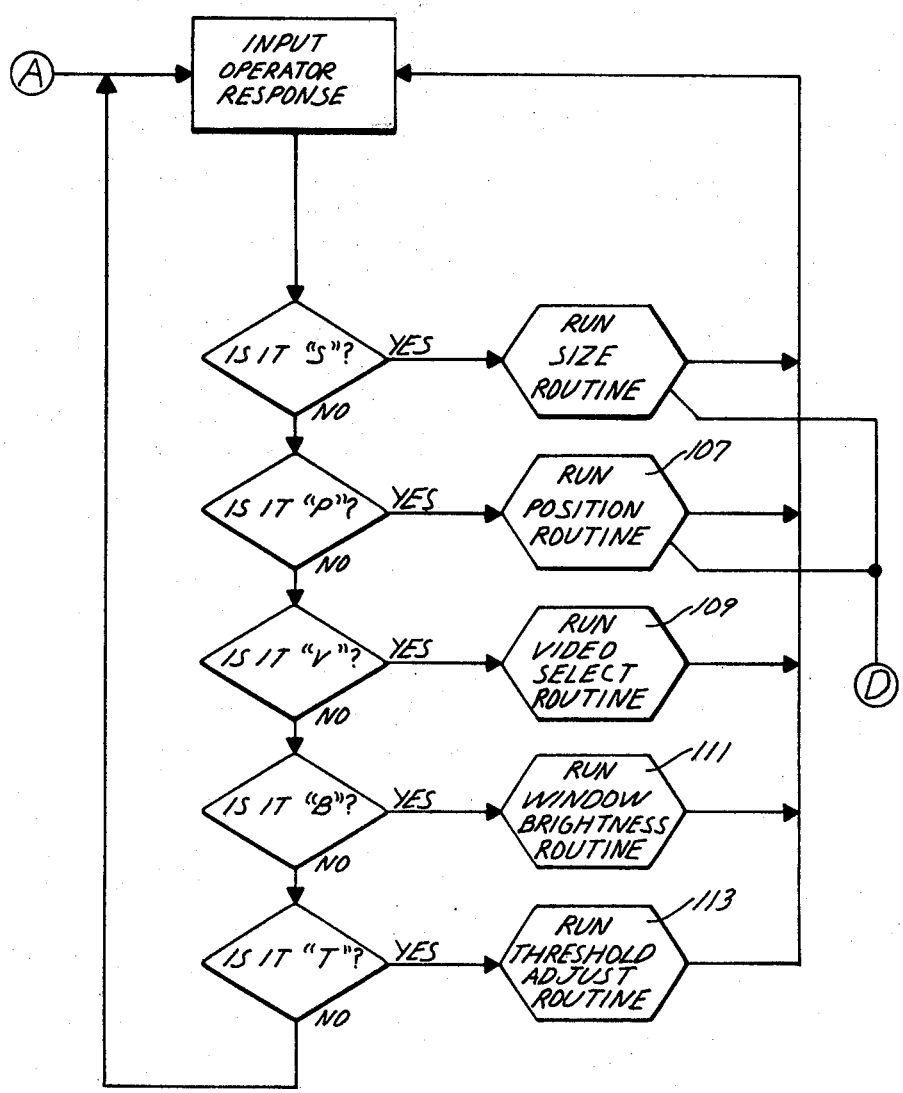

As shown in FIG. 4, the size of the window is controlled by four keys on the keyboard identified respectively by an UP arrow, a DOWN arrow, a LEFT arrow, and a RIGHT arrow. During the Size routine, the UP and DOWN arrows are used to move the bottom margin of the window up or down relative to the top margin to change the vertical dimension. The RIGHT and LEFT arrow keys operate to move the right hand margin to the right or left relative to the left hand margin to change the width of the window. For example, if the UP arrow is selected, as indicated at 91, the top and bottom bits of the first window defining word in the parameter storage memory 42 are read out of the parameter memory and compared. Unless the vertical dimension of the window has been reduced to zero, the bottom parameter is decremented by one and stored back in the parameter memory 42. If the UP key is still depressed, the loop is repeated until either the bottom margin of the window is moved up to the desired vertical spacing from the top margin, in which case the key is released by the operator, or the top and bottom margins are reduced to a single line. The DOWN key, on the other hand, increments the bottom margin value until the key is released or the bottom corresponds to the last line of the raster scan. Similarly, each of the other two keys, if selected, increment or decrement the right hand margin and store the modified parameter in the parameter memory 42.

Figure 6:
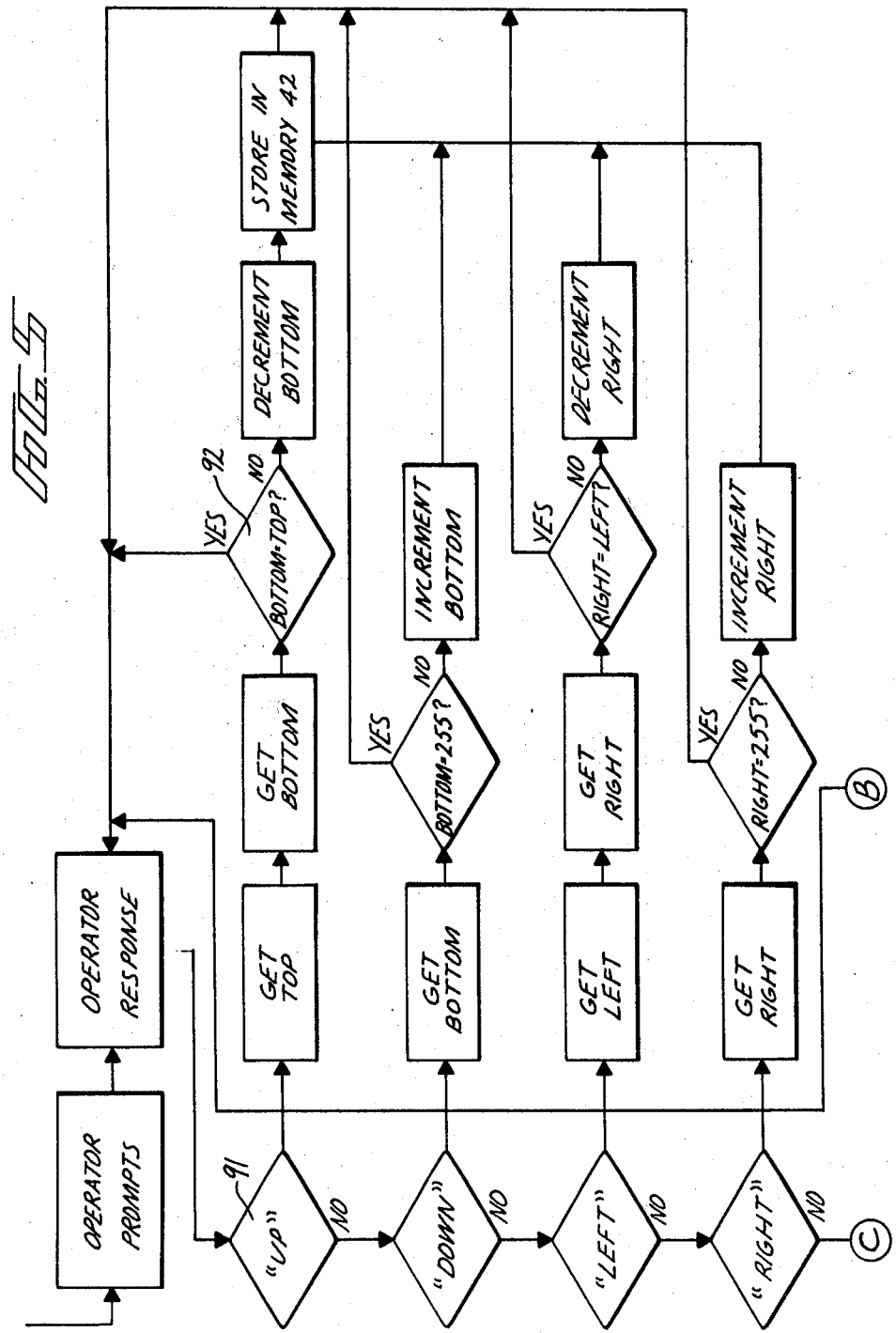

Once the size of the window has been established by the operator, he may elect to change the position of the window, in which case he so indicates in his response and causing the program to branch, as indicated at 92 in FIG. 6, to execute the Position routine 107. Alternatively, he may select to run the Video Select routine 109, or select the Window Brightness routine 111, or select the Threshold Adjust routine 113. If none of these routines are selected or have been selected and completed, the program issues another output operator prompt, as indicated at 100, to determine if another window is to be programmed. If the operator inputs information that no more windows are required, the program branches, as indicated at 102, to reset the parameter memory to the address for window 1 and to store in memory information as to the total number of windows stored in the parameter memory. The program then enters a Tolerance Calculation routine, as indicated at 104, for determining the upper and lower pixel count limits for the particular window. When this is completed, the program returns to the initializing system.

If the operator indicates that another window is to be defined, the program branches at 102 to increment the parameter memory address to the next word in the parameter memory and then loops back to the beginning of the Generate New Program routine to enter a new input operator response. Thus as to the next window, the operator can select whether he wants to change the size using the Size routine or if he wants to reposition the window by the Position routine, or whether to change which video or combination of video signals are displayed on the monitor, as indicated at 109, whether he wants to change the window brightness, as indicated at 111, or whether he wants to adjust the threshold, as indicated at 113.

Figure 7:
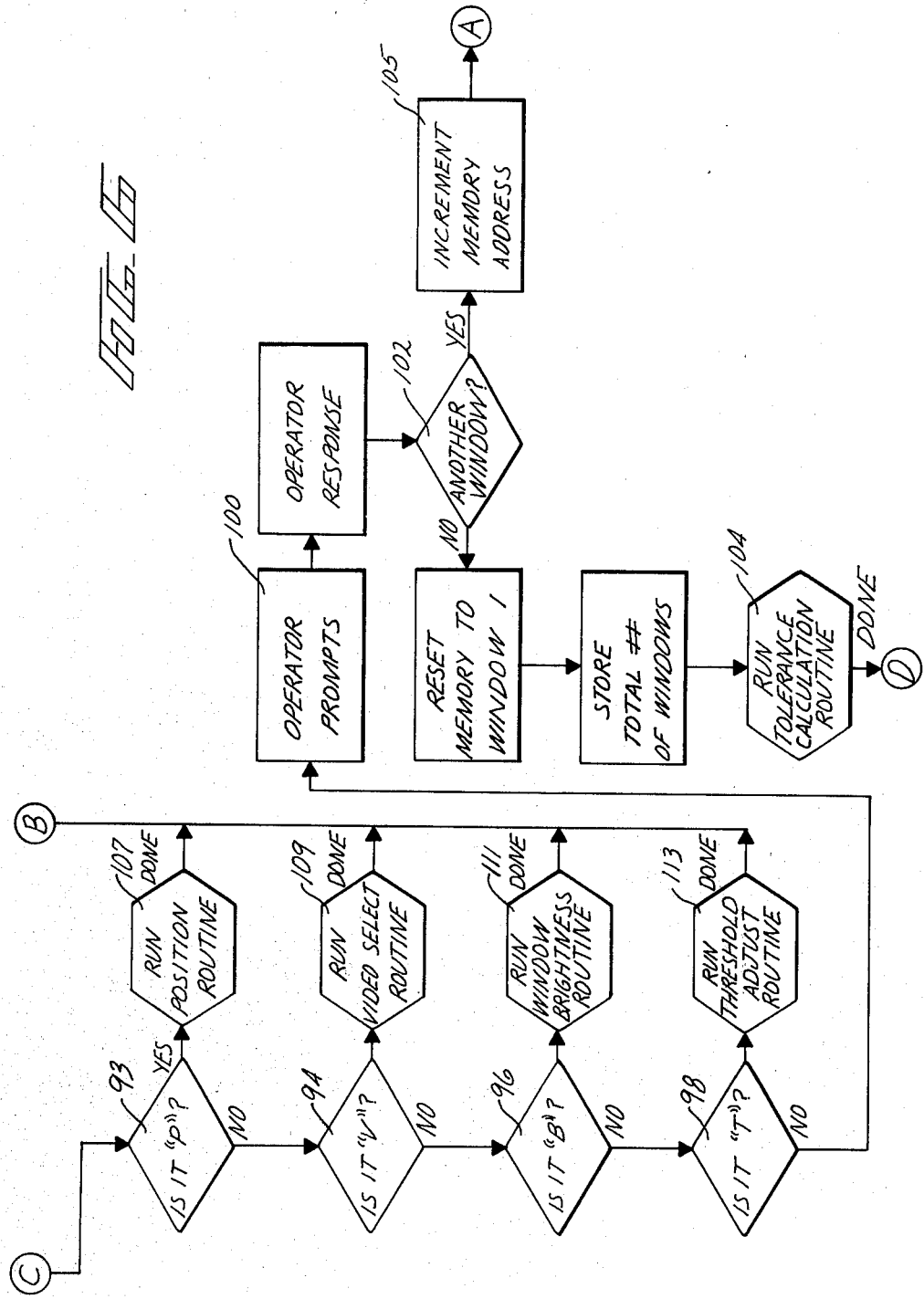
Figure 8:
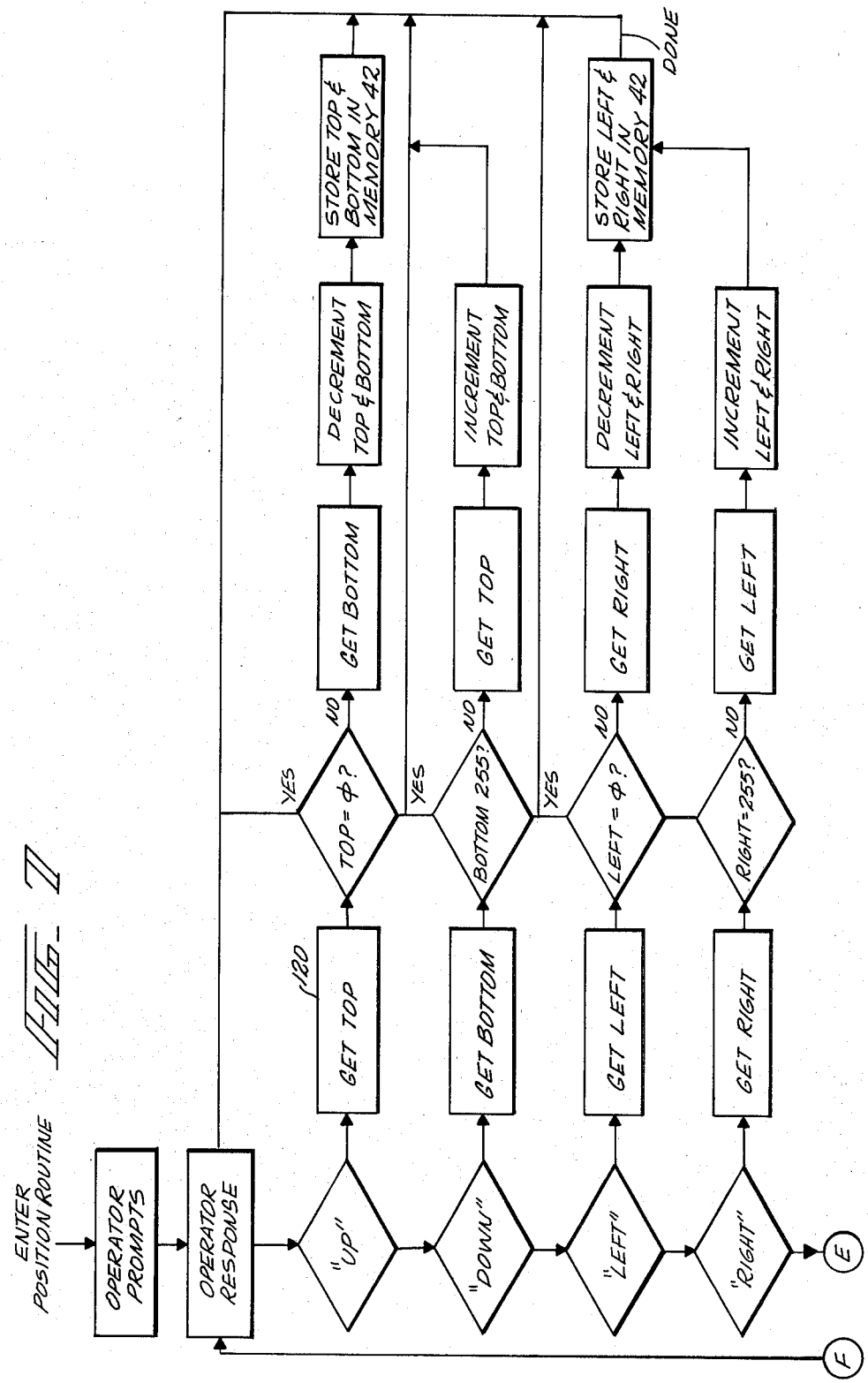
Figure 9:
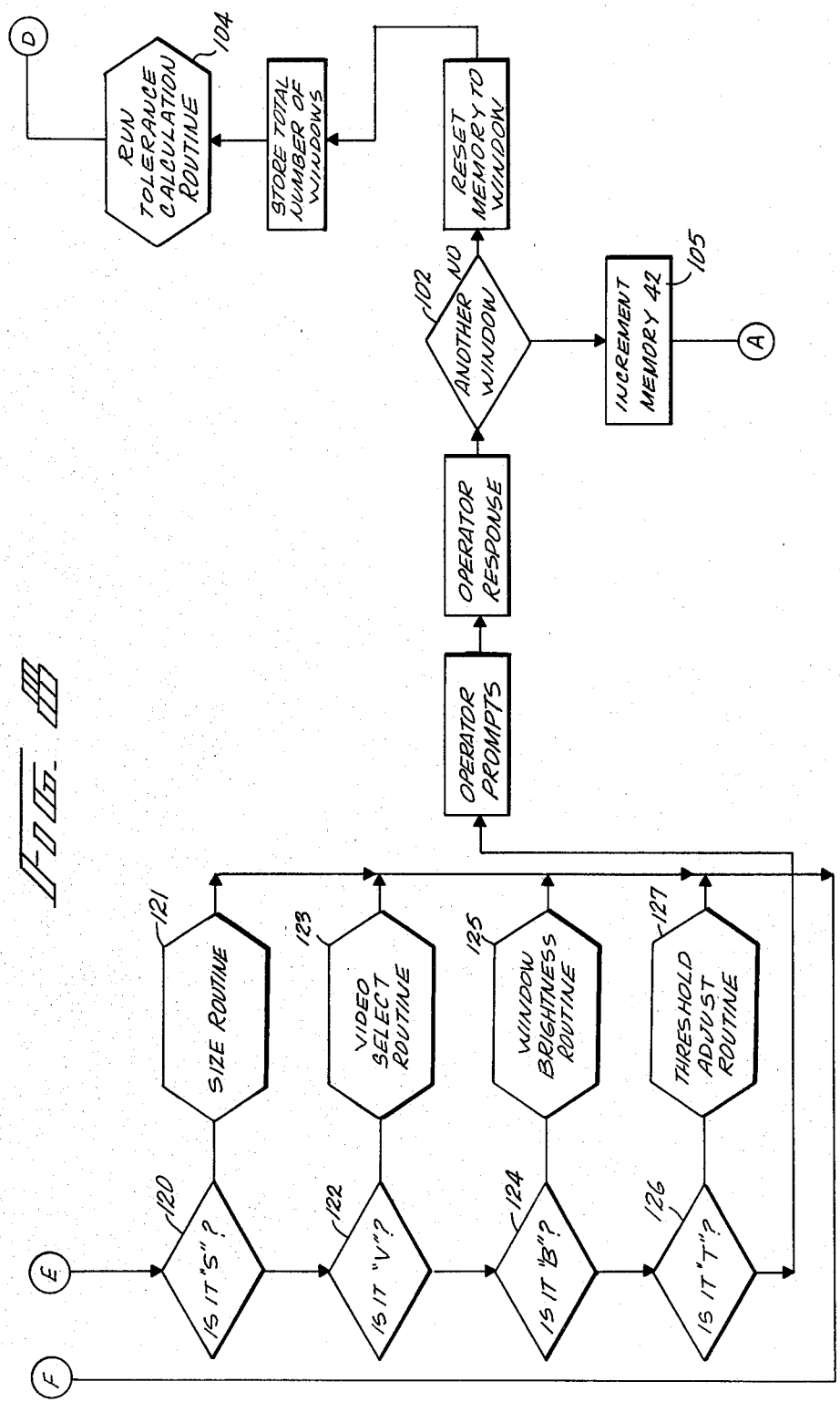
Figure 10:
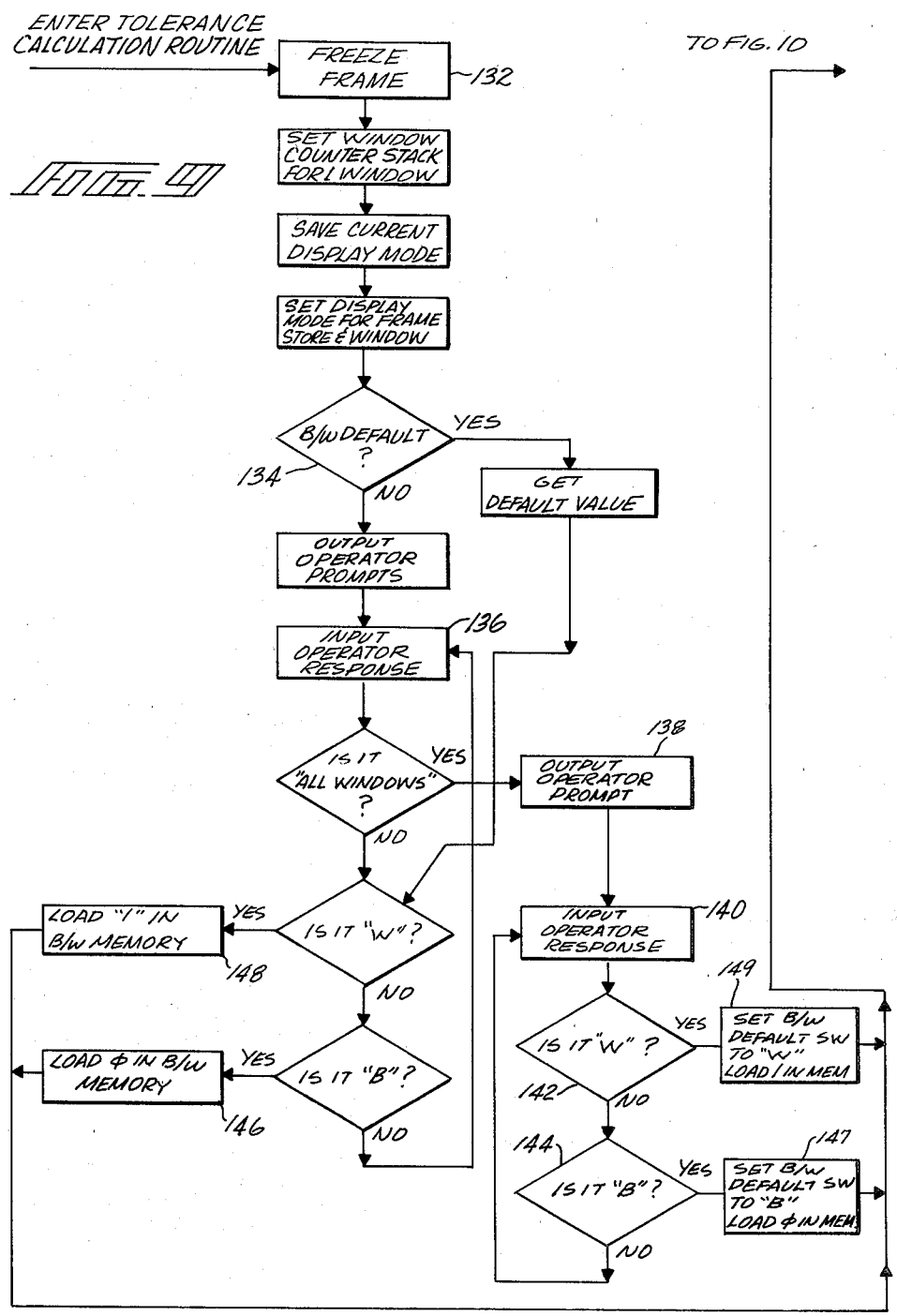

The Window Positioning routine is shown in FIG. 7. Again the UP, DOWN, LEFT and RIGHT keys are used by the operator to change the position of the window. If the UP key is actuated, the parameter defining the top of the window is read out of the parameter memory 42, as indicated at 120. If the top parameter is not zero, the top and bottom parameters are both decremented and stored back in the parameter memory. This loop is repeated as long as the UP key is depressed or until the top of the window is positioned at the top of the image field. The DOWN key operates in the same manner to increment both the top and bottom parameters in the parameter memory. The LEFT and RIGHT keys similarly decrement or increment the left and right parameters stored in the parameter memory.

After the Positioning routine is complete, the operator may want to run the Size routine again, as indicated at 107, run the Video Select routine, as indicated at 109, run the Window Brightness routine, as indicated at 124 and 125, or run the Threshold Adjust routine, as indicated at 126 and 127. If not, the operator prompts ask if another window is to be entered, and in response to the operator input, a determination is made, as indicated at 128, whether or not another window is to be programmed. If so, the parameter memory is incremented, as indicated at 130, and the operator is prompted to select the routines necessary to establish the next window parameters.

If another window is not to be programmed, again the parameter memory is reset to window 1 and the total number of windows is stored in the processor memory.

The Tolerance Calculation routine (see FIG. 9) is entered after the window parameters for all of the defined windows have been established. First the freeze frame operation described above in connection with FIG. 1 is performed by the hardware, as indicated at 132. One completed frame is stored in the frame memory 30 of a sample part, for example, to establish the standard number of black and white pixels within any of the selected windows. The window counter stack is set for one window and the current display mode, as controlled by the video switch and mixer circuit 24, is stored for later reference. The display mode is then set for displaying the output of the frame store memory 30 overlaid with the window as set by the output of the window parameter compare circuit 56, as indicated at 133.

A determination is then made, as indicated at 134, as to whether black or white pixels are to be selected by the operator or to be selected by default. If it is to be selected by the operator, output operator prompts are diplayed, and the operator inputs a response, as indicated at 136, as to whether black or white pixels are to be counted and whether the selection is to apply to all windows. If all windows are to be counted the same, an output operator prompt, as indicated at 138, asks whether the pixels counted for all windows are to be black pixels or white. The operator responds, as indicated at 140, and a determination is then made as to whether the operator selected white or black pixels, as indicated at 142 and 144. In either case, a default which is set and a zero or one is stored in the parameter storage memory 42, depending upon whether a black or white pixel has been selected, as indicated at 145 and 147. If the operator response at 136 is a black or white pixel for only the one window, a zero or one is stored in the parameter memory as part of the window control word being processed, as indicated at 146 and 148.

Once the black or white bit is set in the window defining word stored in the memory 42, a determination is made, at 149 (see FIG. 10), whether there is to be a default to a previously established tolerance value or whether a new tolerance value is to be determined. If a new tolerance value is to be determined, an output operator prompt, indicated at 150, allows the operator to indicate whether the tolerance value is to be applied to all windows, and whether a standard value of 10 percent is to be used as the tolerance or some other value. If the response indicates all windows, a user defined value is entered on the keyboard, and the default switch, as indicated at 151, is set so the same tolerance will be used by default for all windows. If the standard value is to be used, the 10 percent tolerance limit is stored in the tolerance buffer, as indicated at 154. If a standard value is not used, the upper and lower tolerance values are stored in the tolerance buffer in response to operator-keyed inputs. The pixels are then accumulated by the counter 64, as indicated at 155, and the upper and lower pixel count limits are computed using the tolerance values in the tolerance buffer and stored in the parameter memory 42. The Tolerance routine is then exited back to the Executive routine.

Figure 11:
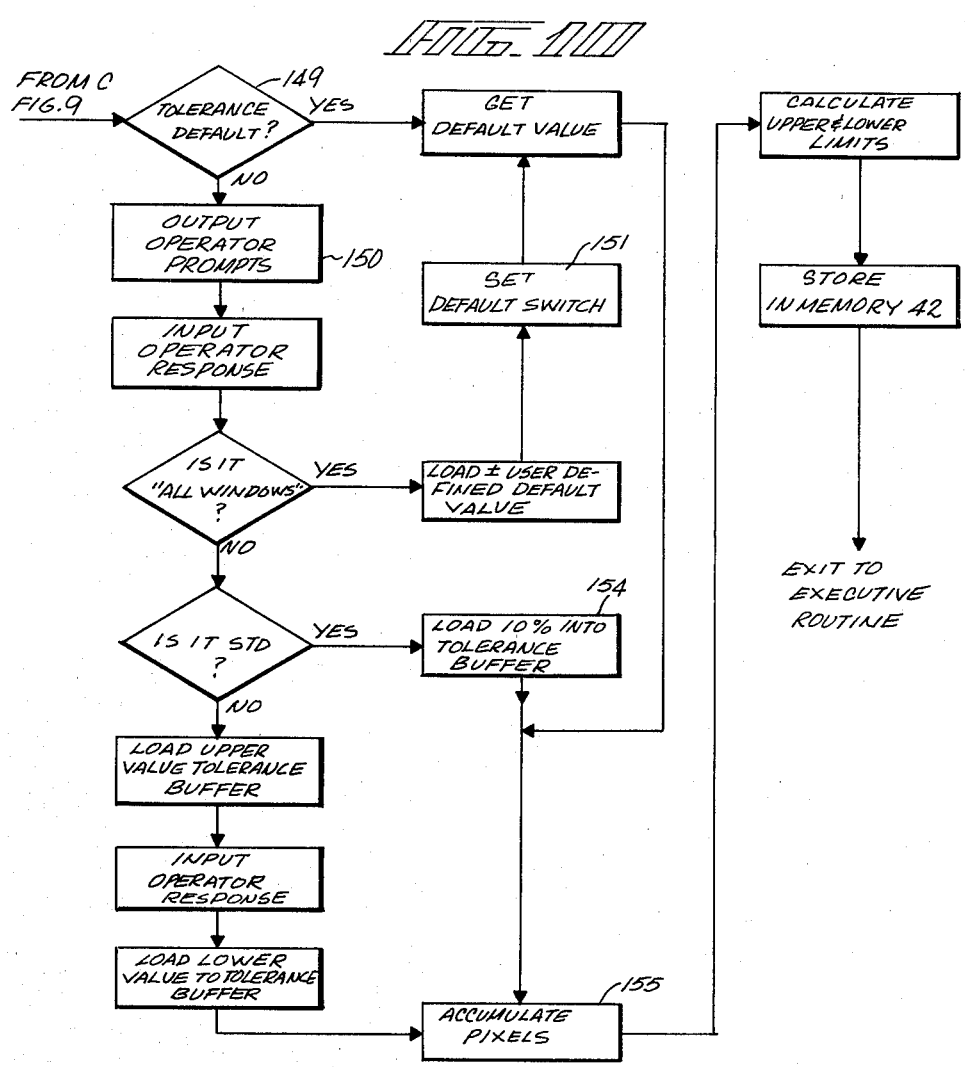
Figure 11:
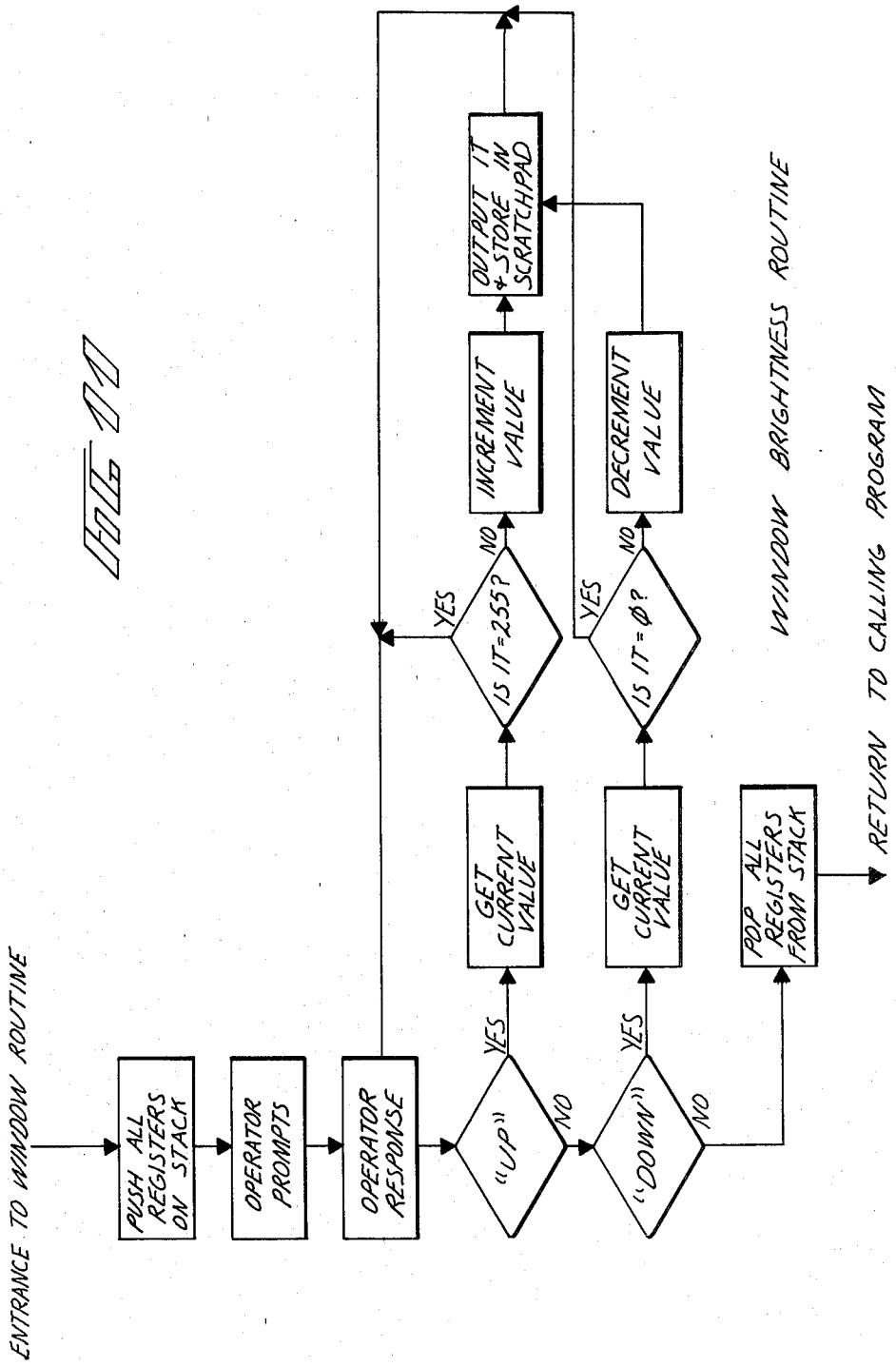
Figure 12:
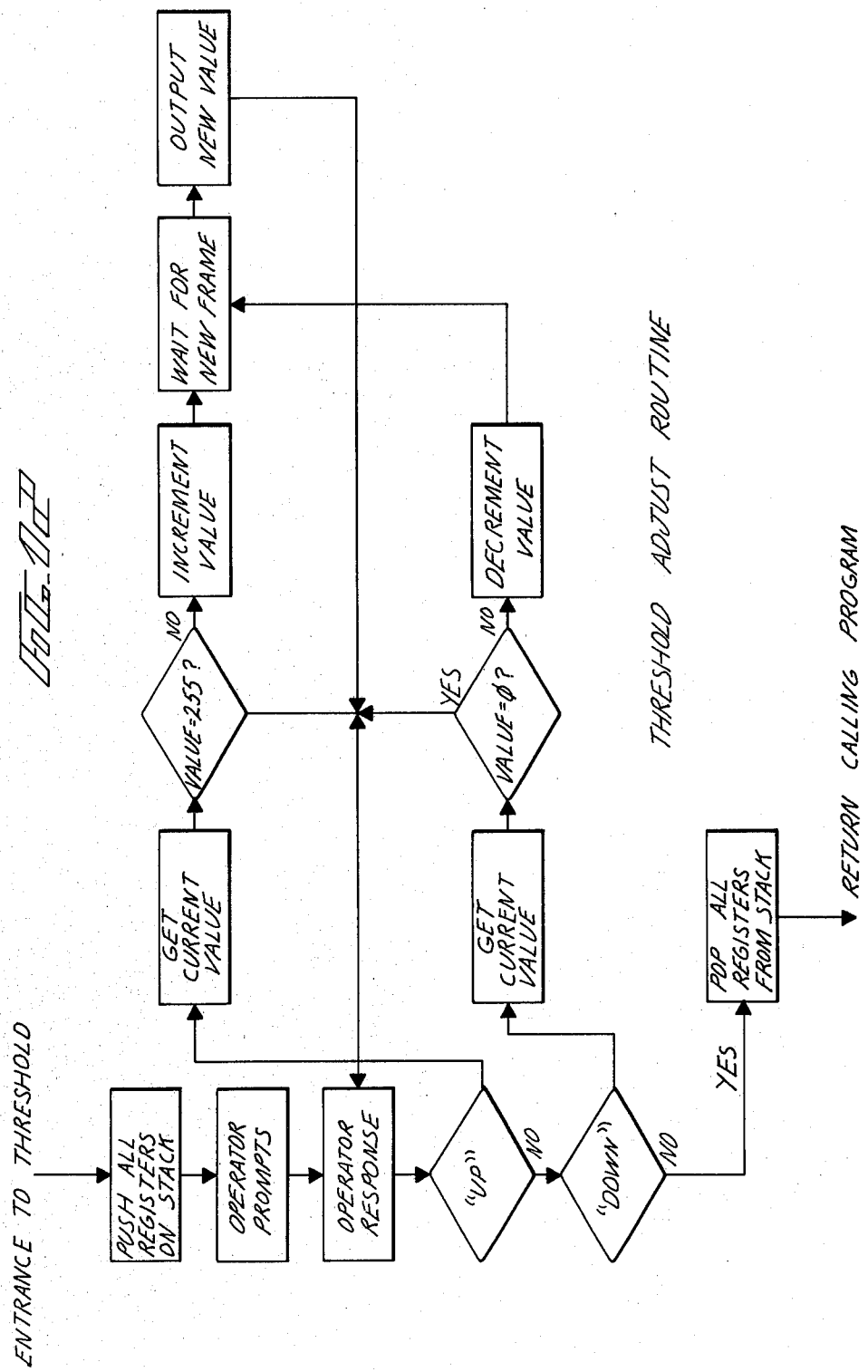

The Window Brightness Setting routine and the Threshold Adjust routine are shown by the flow diagrams in FIGS. 11 and 12, respectively. These two routines are substantially identical and merely use the UP arrow and DOWN arrow keys on the keyboard to increment or decrement the respective brightness and threshold values which are outputted from the processor to the brightness control and the threshold pulses and the threshold control.

Figure 13:
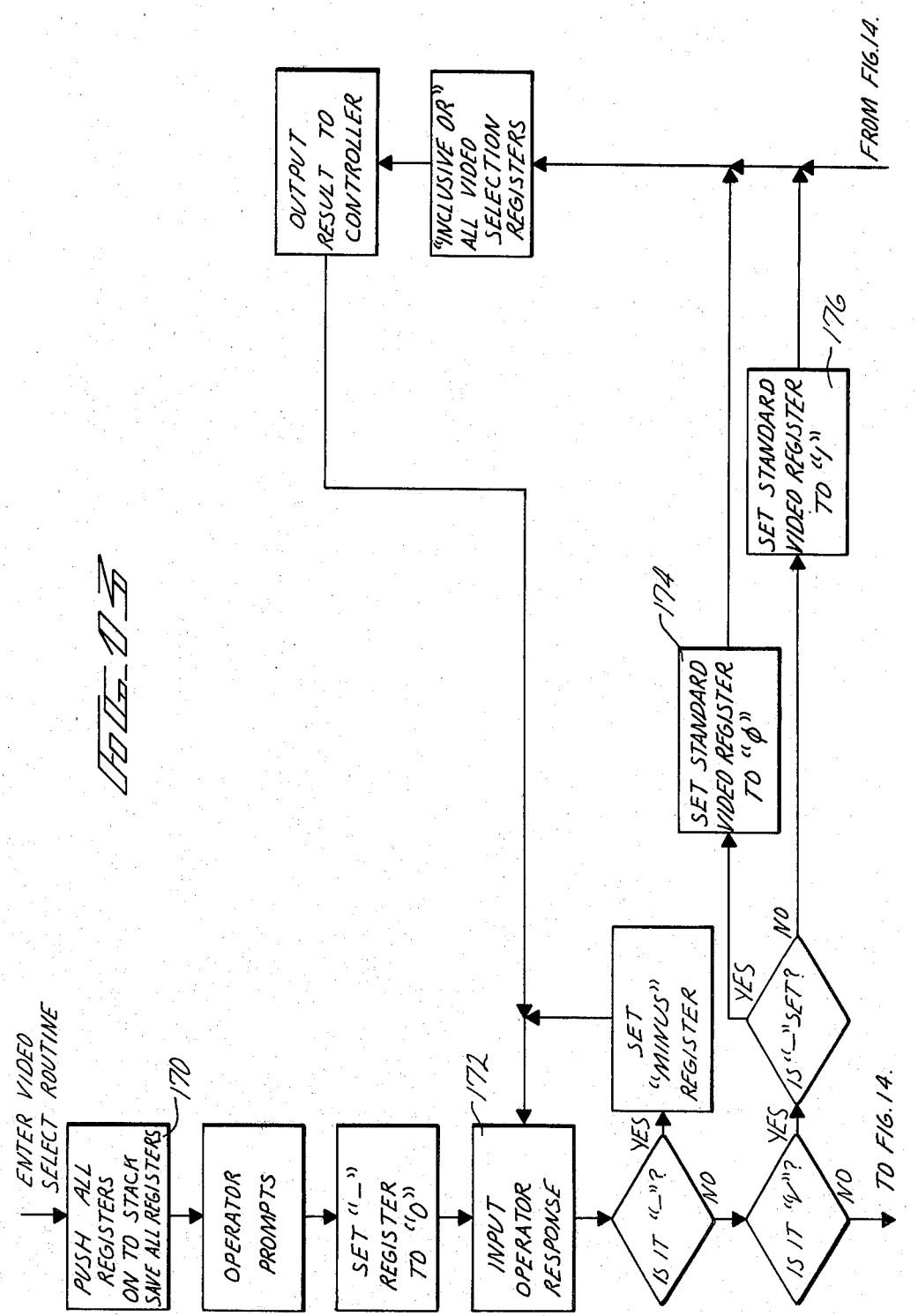
Figure 14:
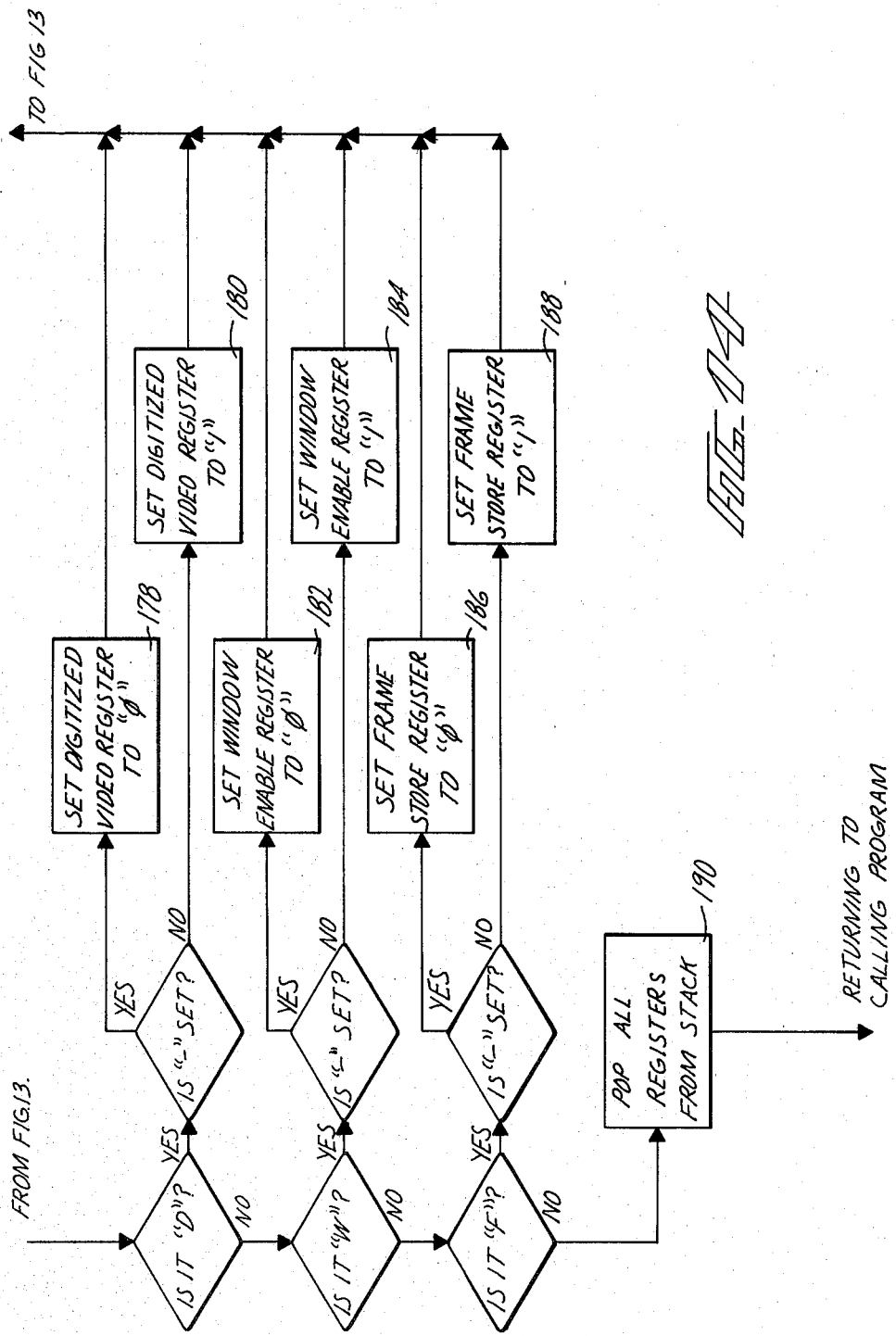

Referring to FIG. 13, there is shown the flow diagram of the program for selecting the video display mode. As pointed out above, the video switch and mixer circuit 24 may select one or more inputs for controlling the video display. The Video Select routine first saves the contents of all registers in the CPU by pushing them onto a stack, as indicated at 170. It then outputs operator prompts asking the operator to identify through the keyboard which display modes are to be used. The "minus" register in the CPU is then cleared, and the operator inputs his response, as indicated at 172. If the response is to clear the screen, the "minus" register is set to zero. If a display is to be set, the "minus" register is set to one. If the response is to display or stop display of the video signal from the camera, the standard video register is set to either one or zero, as indicated at 176 and 174. If the response is to not display or display the digitized video, the digitized video register is set to zero or one, as indicated at 178 or 180. If the operator input response is to erase or enable the window, the window enable register is set to zero or one, as indicated at 182 and 184. Finally, if the operator response is to erase or store a frame, the frame store register is set to a zero or one, as indicated at 186 and 188. Before exiting the routine, the registers are reloaded from the stack, as indicated at 190. Otherwise, the output of the standard video register, the digitized video register, the window enable register, and the frame store register are transferred over the data bus to the video controller to set the video switch and mixer 24 to the selected mode.

Figure 15:
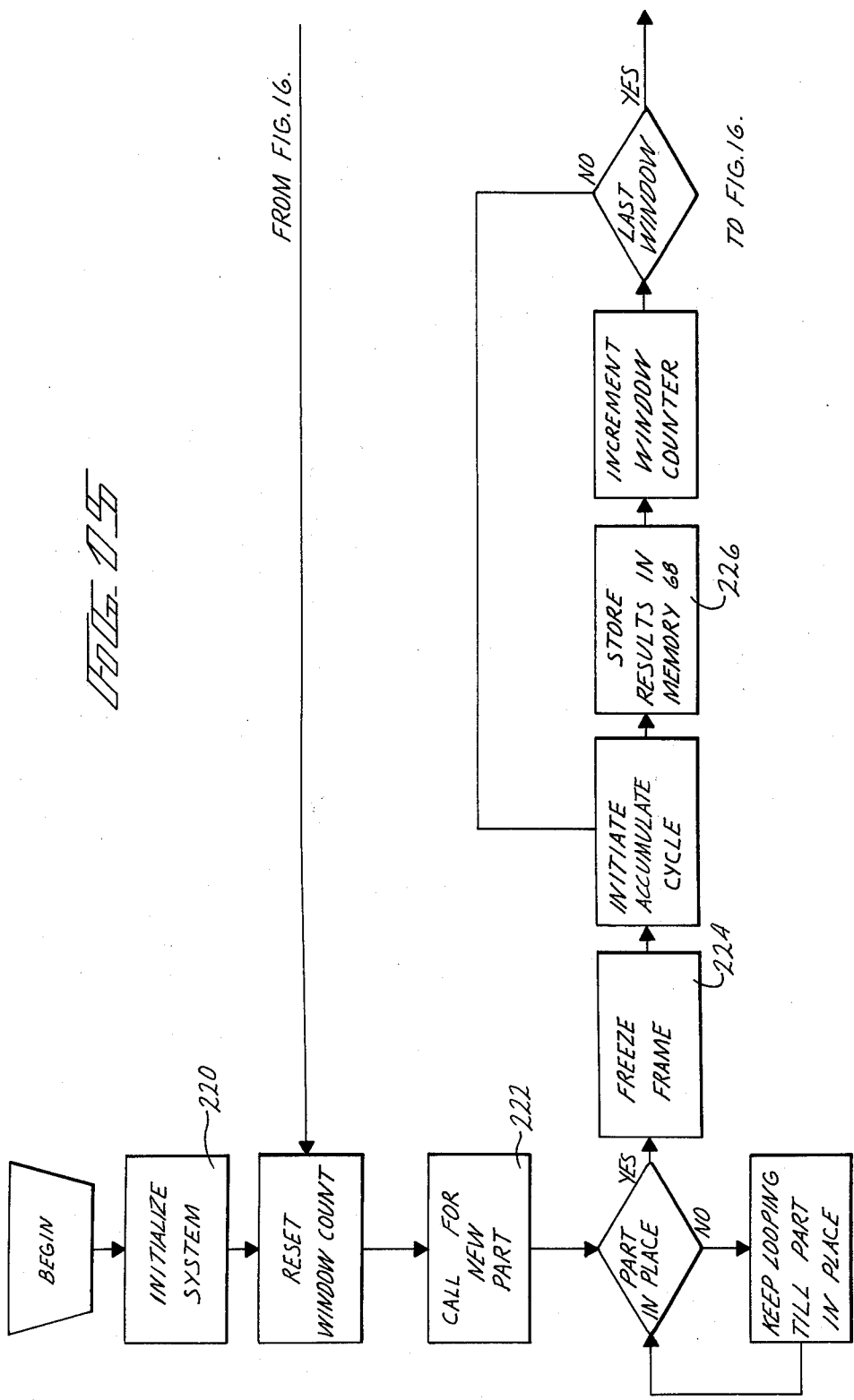

The system as thus far described constitutes the basic system. The operator can control the system through the keyboard to analyze a variety of different parts. FIGS. 15 and 16 show a flow diagram of a typical operating sequence for the user of the system in analyzing production parts, for example, in sequence to determine which parts are good and which parts are bad. After operation begins, the system is initialized to store a plurality of window parameters in the parameter memory 42 in the manner described above using a standard or sample part. With the window count reset, a new part is positioned in the field of view of the camera, as indicated at 222. The part may be positioned mechanically, as by means of a conveyor or the like. Once the part is in place, one frame of the image field, including the new part is stored in the frame memory, as indicated at 224. An accumulate cycle counts the number of black or white pixels within a window area defined by the first word in the parameter memory 42. The number of counts is compared with the upper and lower limits and the results stored in memory, as indicated at 226. This is repeated for each of the windows stored in the parameter memory until the results of the last memory have been stored. At this time the window counter is reset, as indicated at 228. The window results for each window are then analyzed and if any window shows results that are that are not within the prescribed limits, the part is discarded, as indicated at 230, and a failure counter is incremented to keep track of the number of bad parts. If the window results are within limits for all of the windows, the part is passed as being a good part, as indicated at 234, and a counter which keeps track of the number of good parts is incremented. The window count is then reset and a new part is analyzed.

The flow charts of FIGS. 15 and 16 is merely representative of any number of possible ways in which the video process control system of the present invention may be utilized. The present invention provides a highly flexible arrangement by virtue of the large number of windows that can be established. The windows can be processed independently so that they may be positioned at widely spaced points on the screen, can be made to overlap, or can be nested one inside of another. Since all the information defining one window is available with a single memory cycle, all the windows can be processed within a half frame interval, that is, the time between successive vertical sync pulses of a standard video raster scan.

What is claimed is:

1. Video process control apparatus comprising video camera means including raster scan means for generating a video output signal of the image field of the camera, means dividing the video signal into a series of pixels, means converting each pixel to a binary bit whose value indicates whether the amplitude of the video signal is above or below a predetermined threshold amplitude, frame memory means storing the bits converted from pixels forming one frame of the raster scan, digital memory means storing a plurality of digitally coded words, each word defining the margins of one predetermined window area within the image field of the camera, each word further defining the desired number of bits of one value corresponding to pixels within the defined area, means for reading out a selected full word at a time from the digital memory means, counter means, control means responsive to any selected word read out of said memory means for transferring all the bits of one value corresponding to pixels within the area defined by the selected word from the frame memory means to the counter, and means responsive to the selected word read out of said memory and the counter means for comparing the number of bits counted with the desired number of bits defined by said selected word.

2. The apparatus of claim 1 wherein said memory means stores words defining a range within upper and lower limits of the desired number of bits of one value within the defined area, said comparing means including means generating an output signal indicating when the counter means is within said range.

3. Apparatus of claim 2 further including means for reading out a plurality of said words in the memory means in sequence to the control means and the comparing means.

4. The apparatus of claim 3 further including means storing the output signals from said comparing means with each word read out of the memory means.

5. Apparatus of claim 4 further including video monitor means, means selectively or simultaneously responsive to said video signal output from the camera, the output of said means converting the pixels to binary bits, and the output of said frame memory means for driving the video monitor to form visual images from said outputs.

6. Apparatus of claim 5 further including means responsive to the selected word read out of memory defining a window for changing the image brightness on the monitor within the window area defined by said selected word.

7. Apparatus of claim 6 further including means for adjusting said threshold value of said means converting pixels to binary bits.

8. Apparatus of claim 1 wherein said digital memory means includes means for addressing and reading out each word in parallel.

9. Apparatus of claim 8 further including means for addressing and selectively writing in or reading out selected portions of each word.

10. Apparatus of claim 9 further including central processor means for selectively addressing each word or a portion of each word in the digital memory means.

11. Apparatus for visual analyzing assembly parts or the like comprising a video camera, pixel scan means for converting an image field of the camera into a stream of pixels, frame memory means storing the pixels corresponding to one pixel scan of the image field as corresponding number of binary bits, means responsive to each pixel for coding the bit to indicate when the pixel magnitude is above or below a predetermined threshold, window parameter memory means storing a plurality of digitally coded words, each word defining the addresses of bits in the frame memory means corresponding to pixels from a predetermined area of the image field, each word further defining a desired number of bits of one binary value associated with the area of the image field, means reading a selected word out of the window parameter memory, means responsive to each word read out of the window parameter memory means for addressing and reading out the bits stored in the frame memory from the addresses defined by said word, means counting the number of bits of one value read out of the frame memory means, and means comparing the number of bits counted with the desired number of bits defined by said word.

12. Apparatus of claim 11 wherein said means reading out a selected word out of the window parameter includes means for reading out a plurality of said words in sequence, each word separately addressing and reading out a different group of bits from the frame memory means.

* * * * *

UNITED STATES PATENT AND TRADEMARK OFFICE
CERTIFICATE OF CORRECTION

PATENT NO. : 4,400,728

DATED : August 23, 1983

INVENTOR(S) : David J. Long

It is certified that error appears in the above-identified patent and that said Letters Patent is hereby corrected as shown below:

Column 2, line 63, "rest" should read -- reset --. Column 3, line 37, "addressable" should read -- addressed --; line 43, "bit-directional" should read -- bi-directional --. Column 4, line 33, "but" should read -- bus --. Column 5, line 34, "point" should read -- print --; line 52, "imputing the the" should read -- inputing the --. Column 7, line 52, "completed" should read -- complete --; line 67, "diplayed" should read -- displayed --. Column 8, line 8, "which" should read -- switch --

Column 10, line 55, claim 11, "visual" should read -- visually --.

Signed and Sealed this

Thirty-first Day of January 1984

[SEAL]

Attest:

GERALD J. MOSSINGHOFF

Attesting Officer

Commissioner of Patents and Trademarks